G. W. LANG.
POWER ATTACHMENT.
APPLICATION FILED OCT. 17, 1918.
1,314,083.
Patented Aug. 26, 1919.
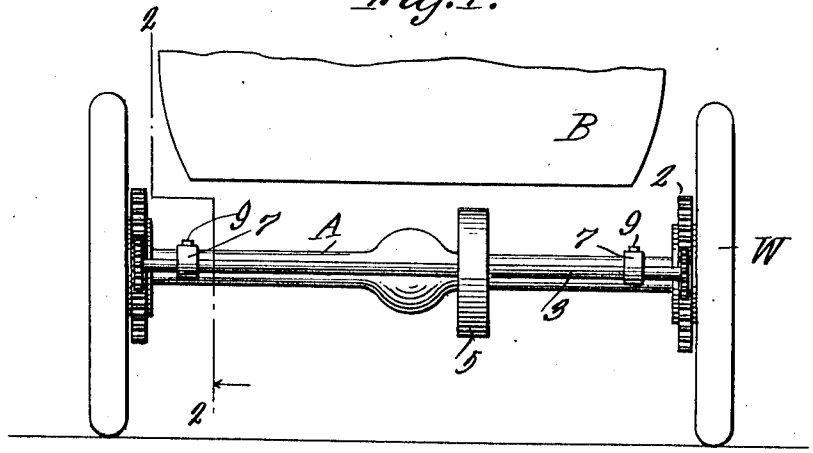
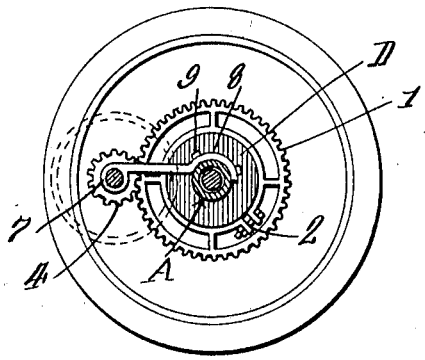
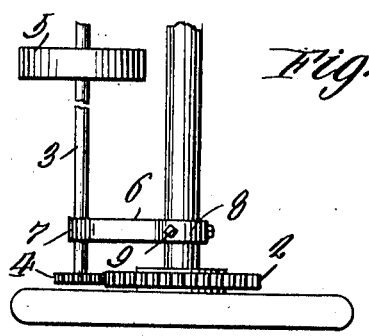
Witnesses
Guy M. Spring
N. L. Kollamer
Inventor
George W. Lang
By Richard B. Owen
Attorney

UNITED STATES PATENT OFFICE.

GEORGE W. LANG, OF LITCHFIELD, NEBRASKA.

POWER ATTACHMENT.

1,314,083.  Specification of Letters Patent.  Patented Aug. 26, 1919.

Application filed October 17, 1918. Serial No. 258,535.

*To all whom it may concern:*

Be it known that I, GEORGE W. LANG, a citizen of the United States, residing at Litchfield, in the county of Sherman and State of Nebraska, have invented certain new and useful Improvements in Power Attachments, of which the following is a specification.

This invention relates to journal boxes, pulleys, and shafting, and more especially to shaft hangers; and the object of the same is to produce a power attachment for application to the rear axle of an ordinary automobile so that machinery can be driven by running the automobile motor when its axle is jacked up off the ground.

The invention comprises a pair of power gears for detachable application to the brake drums, a counter shaft with pinions for engaging said gears and a pulley for driving the machinery, and a peculiar form of hanger for supporting the countershaft.

Details are set forth below, and attention is drawn to the drawings, wherein

Figure 1 is a rear elevation of an automobile with the invention applied.

Fig. 2 is a transverse section on the line 2—2 of Fig. 1.

Fig. 3 is a plan view of one end of the apparatus.

The automobile body is indicated at B and its rear wheels W, its rear axle casing is indicated at A, and the brake drums are D. No novelty is claimed for these parts.

Coming now to the details of the present invention, a ring-shaped driving gear 1 is placed around each brake drum D as shown in Fig. 2 and tightened by means of the bolt 2, so that the revolving brake drum becomes in itself a power gear. A counter-shaft 3 has pinions 4 at its extremities engaging the gears 2 and somewhere in its length is a pulley 5 from which a belt may lead to a machine either on the ground or within the body B of the vehicle. Shaft hangers are employed, one near each end of the counter-shaft 3. Each has its body marked 6, and an eye or bearing 7 at its outer end in which the counter shaft is journaled and its inner end 8 arched over the rear axle casing or housing A and held thereto in any suitable manner as by screws 9. Manifestly the entire attachment can be applied to an automobile with ease and without the necessity for any expert knowledge.

When now the machine is jacked up off the ground in a manner not necessary to illustrate and the engine started, the rear axle and wheels revolve in the ordinary manner and the power gears meshing with the pinions 4 rotate the counter shaft 3 and the pulley 5, at a speed depending upon the proportion of the gears to the pinions. When the device is not to be used it can be removed by withdrawing the screws 9 when the pinions come out of mesh with the gears, and the latter can be left on the brake drums or removed off if desired.

Having thus fully described my invention, what I claim as new and desire to secure by Letters Patent is:—

In a power attachment for automobiles the combination with a pair of ring gears, and means for clamping them to the brake drums of the rear axle; of a power shaft having pinions at its ends and a pulley keyed thereon intermediate its ends, shaft hangers comprising elongated bodies having cylindrical bearings at their outer ends through which said shaft extends the inner ends of said bodies being arched to fit upon the rear axle casing, and means carried by said arched portions for releasably holding the same upon the axle casing, whereby said pinions are releasably held in engagement with said ring gears, thus allowing rotary motion to be imparted through said gears and pinions to said shaft and said pulley.

In testimony whereof I affix my signature in presence of two witnesses.

GEORGE W. LANG.

Witnesses:
F. W. DOUGLAS,
JOHN E. DAUGHERTY.